June 16, 1959 H. BOERICKE, JR 2,890,672

WATERCRAFT HYDROFOIL DEVICE

Filed May 1, 1957 4 Sheets-Sheet 1

INVENTOR
HAROLD BOERICKE, JR.

BY George Sipkin
B. L. Zangwill
ATTORNEY

June 16, 1959

H. BOERICKE, JR 2,890,672

WATERCRAFT HYDROFOIL DEVICE

Filed May 1, 1957

4 Sheets-Sheet 2

INVENTOR
HAROLD BOERICKE, JR.

BY *George Sipkin*
*B. L. Zangwill*
ATTORNEY

June 16, 1959 H. BOERICKE, JR 2,890,672

WATERCRAFT HYDROFOIL DEVICE

Filed May 1, 1957 4 Sheets-Sheet 3

INVENTOR
HAROLD BOERICKE, JR.

BY George Sipkin
B. L. Zangwill
ATTORNEY

INVENTOR
HAROLD BOERICKE, JR
BY *George Sipkin*
*B. L. Zangwill*
ATTORNEY 2,890,672

WATERCRAFT HYDROFOIL DEVICE

Harold Boericke, Jr., Washington, D.C.

Application May 1, 1957, Serial No. 656,469
11 Claims. (Cl. 114—66.5)
(Granted under Title 35, U.S. Code (1952), sec. 266)

The invention described herein may be manufactured and used by or for the Government of the United States of America for governmental purposes without the payment of any royalties thereon or therefor.

This invention relates to hydrofoil craft and more particularly to cavitation-adapted hydrofoils for supporting such craft in flight.

Briefly, the formation of cavitation on a body proceeding through water is related to the shape of the body, the speed of the body and its depth below the surface of the water. In particular, it is governed by the minimum negative pressure experienced on the body. If this pressure drops below the vapor pressure of water, about 3 p.s.i., a bubble of water vapor is formed.

The purpose of applicant's novel cavitation-adapted hydrofoil is to allow a hydrofoil boat to operate at a high supercavitating top speed and still take off at a low speed.

A hydrofoil boat makes the fullest use of its capabilities only if it is foil-borne through as much of the speed range as possible. Until recently, top speed has been limited by the onset of variable cavitation on the foil, and take-off speed has been kept high by the limited hydrofoil lifting area available. Requirements for a large foil-borne speed range present a severe compromise to the designer.

Hydrofoil boats now operating have foils proportioned from data furnished for airplane wing sections operating at subsonic speeds. Such hydrofoil and strut sections, hereinafter called type *a* and *a'* respectively, are of a conventional teardrop shape and prove to be efficient at speeds up to about 50 knots. At greater speeds, the suction on the top face of these hydrofoils, which forms a large part of the lift, becomes so great as to cause bubbles of water vapor to form at the region of greatest suction. As the water flow carries them past the region where they are formed, the pressure decreases again, and the bubbles collapse. The shock of collapse is concentrated at a tiny point. This point is generally on the surface of the hydrofoil so that a particle of the metal is eroded away, a process, which, if continued, can soon destroy the efficiency of the foil. The formation and collapse of water vapor bubbles is called variable cavitation and because of it, present hydrofoil boats are designed for top speeds less than about 50 knots.

Further investigations have developed hydrofoil shapes which allow slightly higher speeds free of variable cavitation. The cross sections are characterized by very gentle curves approaching those of a circle; these hydrofoils and strut sections will be referred to hereafter as sections *b* and *b'*, respectively. Because the gentle sectional curves limit the amount of suction on the top surface of the hydrofoil, lift is also limited. This makes the section slightly less efficient in lift. Use of such hydrofoils allows a slightly higher top speed for the craft.

Recent investigations have developed hydrofoil and strut shapes which can operate continuously at cavitating speeds without damage to the metal. Characterized by a fixed water vapor bubble which extends for the length of the hydrofoil and trails beyond it, this type of operation is known as supercavitating flow. Sections designed for it, are generally of a wedge shape with the sharp edge forward and a blunt edge aft. These foil and strut sections will hereafter be referred to as sections *c* and *c'*, respectively. Since the top surface of the foil contacts only water vapor, and the bottom surface is the only one which is wetted, the drag is low, and the efficiency can be excellent. Foils designed for such conditions are not limited by any top speed presently known, and thus greatly extend the speed capabilities of hydrofoil boats.

Low take off speed in hydrofoil boats can be achieved either by disposing small foil surfaces at a large angle of attack, or by using large surfaces at small angle of attack. The practical difficulty with the former approach is the likelihood of loss of lift by air sucked down from the water surface caused by the high angle of attack, called air entrainment. This effect is partially avoided by using large surfaces at small angles of attack. Hydrofoil boats using the ladder, surface-piercing, and diamond-shaped hydrofoil use this principle, and as the speed increases, the craft rises progressively out of the water, successively emerging the foil surfaces until at high speed they ride only on the lowest surfaces. This is because for a given angle of attack and lift force, the hydrofoil needs less area at higher speeds. Foils of the ladder, surface-piercing and diamond-shape also provide a reserve of area to prevent loss of flight, often called crashing. If for any reason the hydrofoils should lose lift through fouling or wave action, a dropping of the hull occurs. In boats using hydrofoils of the above type, reserve lifting areas become immersed and give additional lift, thus preventing enough dropping to cause the hull to strike the water.

Insofar as applicant has been able to determine, present hydrofoils are not designed for supercavitating speeds, and will not operate efficiently at speeds greater than about 50 knots.

From the high and low speed considerations, applicant deduced that it is desirable to incorporate in a given hydrofoil an adaptation to cavitation, so that at low speed when the upper surfaces are immersed, these upper surfaces are formed of shape *a*; an efficient shape for subcavitating speeds. For intermediate speeds when intermediate surfaces are immersed, these intermediate surfaces are formed of shape *b*. Then when at high speed, only the lowest surfaces are immersed, these sections are of shape *c*, the supercavitating shape. Thus, by a successive change in type of sectional shapes, the hydrofoil is adapted to the cavitation conditions which it will meet at the various operating waterlines. Strut sections *a'*, *b'*, and *c'* are similarly fashioned for low, intermediate and top speeds, respectively.

Accordingly, a broad object of the present invention is to provide an improved hydrofoil.

A further object of this invention is to provide a hydrofoil that operates efficiently at various speeds.

A more specific object of this invention is to provide a cavitation-adapted hydrofoil designed to allow a hydrofoil craft to operate at high supercavitating top speed and still take off efficiently at low speed.

Other objects and many of the attendant advantages of this invention will be readily appreciated as the same becomes better understood by reference to the following detailed description when considered in connection with the accompanying drawings in which like reference characters designate like parts throughout the several views thereof and wherein.

Figures 1, 2:
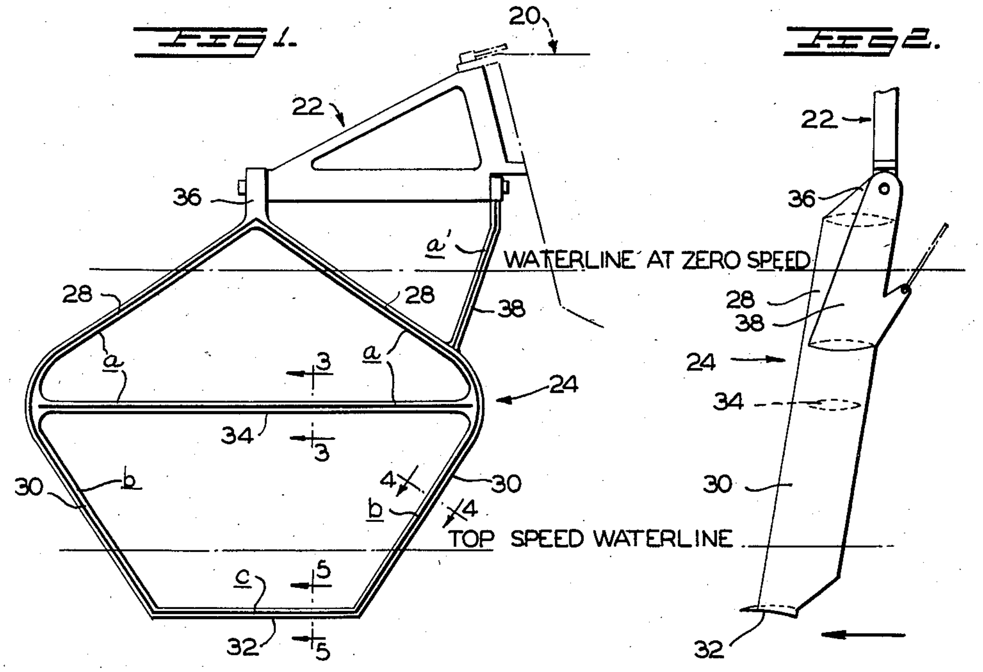
Fig. 1 is a front elevational view illustrating one type of hydrofoil incorporating the present invention.
Fig. 2 is a side elevational view of the hydrofoil shown in Fig. 1.
Figure 3:
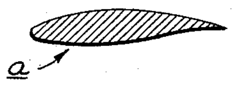
Figure 6:
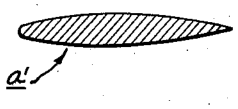
Figure 4:
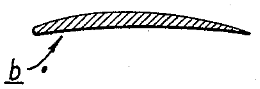
Figure 7:
Figure 5:
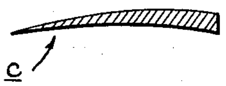
Figure 8:
Figures 9, 10, 11, 12:
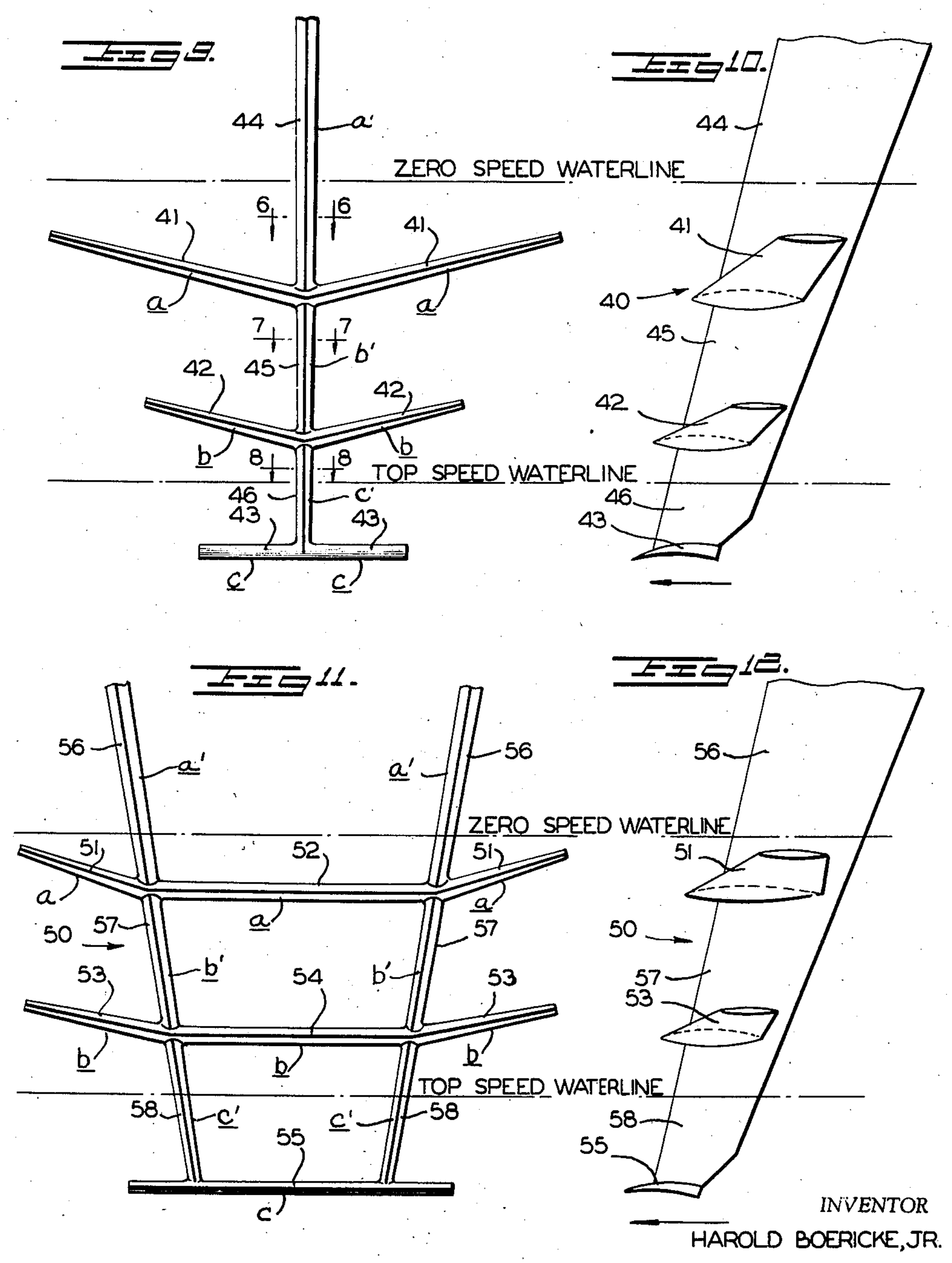
Figure 13:
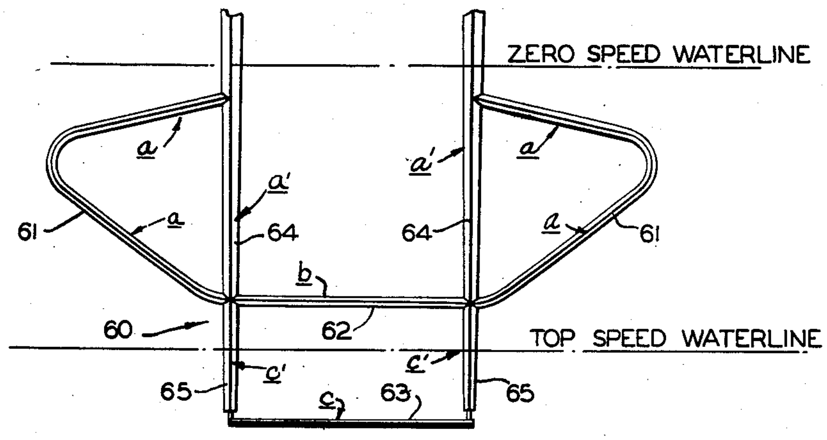
Figure 15:
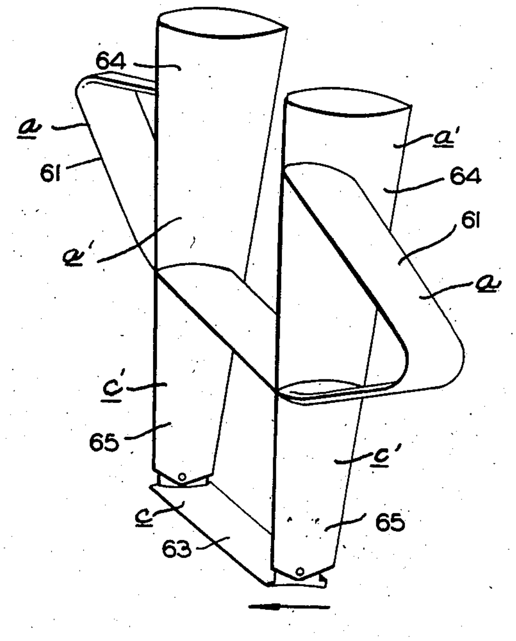
Figure 14:
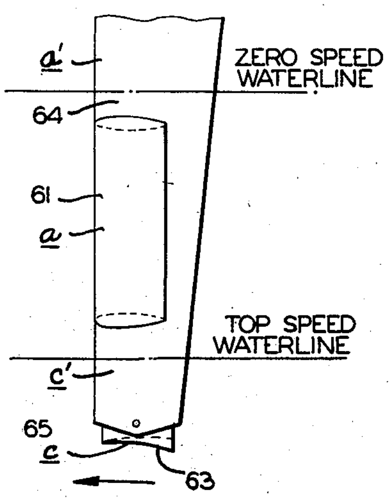
Figure 16:
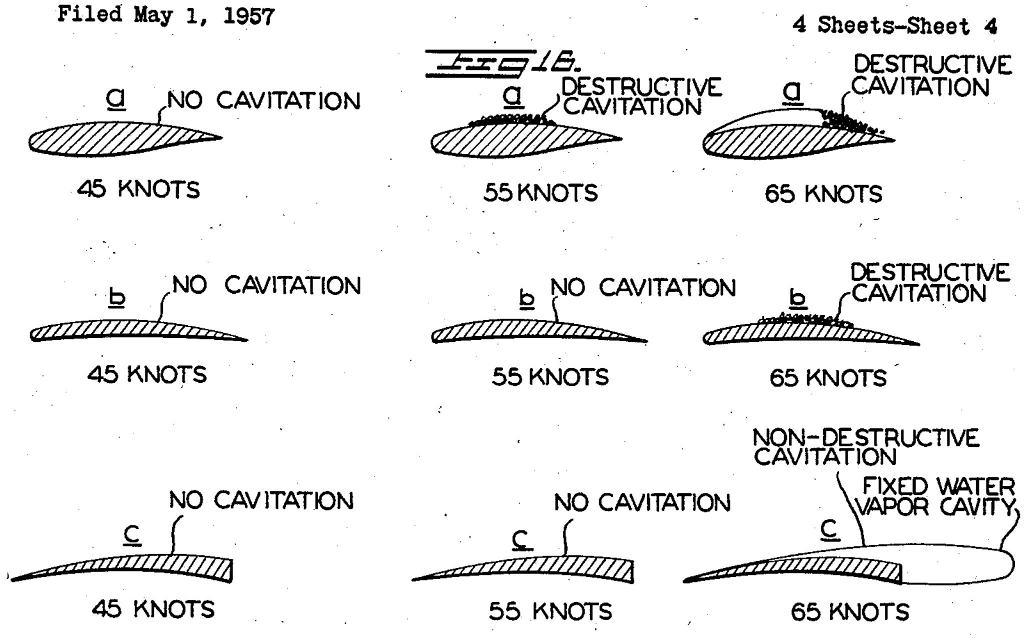
Figure 17:
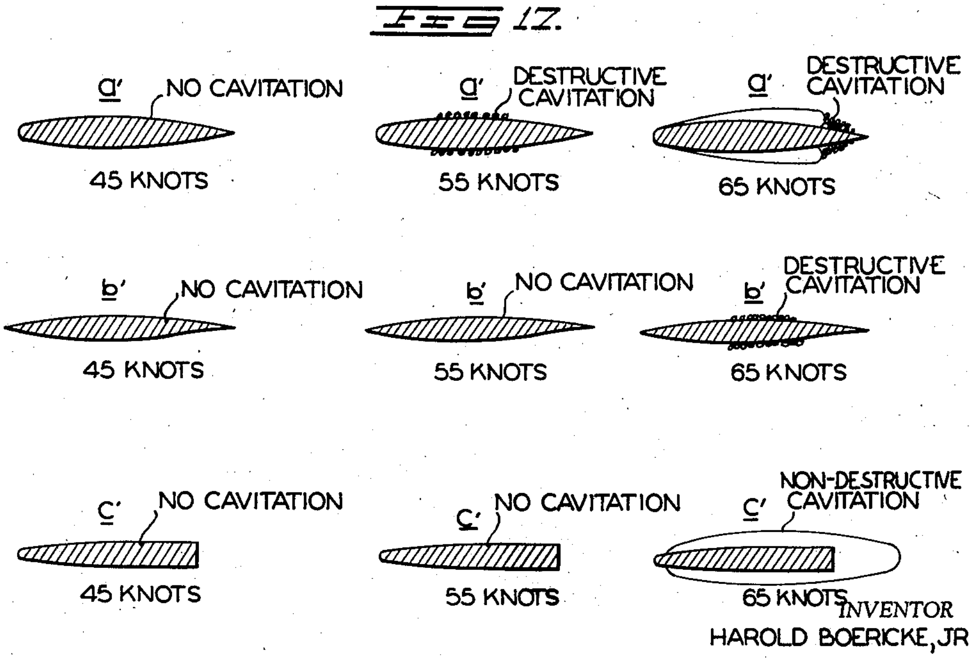

Figs. 3, 4 and 5 are transverse sectional views taken on lines 3—3, 4—4 and 5—5 respectively, of Fig. 1, and illustrating foil sections in accordance with this invention;

Figs. 6, 7 and 8 are transverse sectional views taken on lines 6—6, 7—7 and 8—8, respectively, of Fig. 9, and illustrating strut sections in accordance with this invention;

Fig. 9 is a front elevational view illustrating a second type of hydrofoil incorporating this invention;

Fig. 10 is a side elevational view of the hydrofoil shown in Fig. 9;

Fig. 11 is a front elevational view illustrating a third type of hydrofoil incorporating this invention;

Fig. 12 is a side elevational view of the hydrofoil shown in Fig. 11;

Fig. 13 is a front elevational view of a fourth type of hydrofoil incorporating this invention;

Fig. 14 is a side elevational view of the hydrofoil shown in Fig. 13;

Fig. 15 is a perspective view of the hydrofoil shown in Figs. 13 and 14;

Fig. 16 is a schematic view showing cavitation formation on the various hydrofoil sections at different speeds; and Fig. 17 is a similar schematic view showing cavitation formation on the various strut sections at different speeds.

Referring now to the drawings, first to Figs. 1 and 2, wherein for purpose of illustration there is shown in broken lines a starboard side portion of a hull 20 upon which is mounted a bracket mechanism 22 which in turn mounts a cavitation-adapted, modified diamond-shaped hydrofoil 24. A similar hydrofoil, not shown, may be mounted on the port side of the hull. The mounting of the hydrofoil is generally similar to that disclosed in applicant's copending patent application Serial No. 555,213, filed December 23, 1955. Therefore, for a complete description of the mounting mechanism, reference may be had to such copending application.

Hydrofoil 24 comprises an upper or inverted V portion including a pair of inclined foil members 28, a lower U-shaped portion including a pair of inclined foil members 30 and a base foil 32, and an intermediate horizontal brace and foil member 34; all of which foil members are welded into a unitary structure substantially within a single plane as shown in Fig. 2. At the top of the inverted V, the hydrofoil is connected by a strut 36 to the bracket mechanism 22 and at the inboard side, the hydrofoil is connected to the bracket mechanism by a second strut 38.

In accordance with this invention, the lifting surfaces of the foil and strut members that make up the hydrofoils are of a particular cross-sectional shape. That is with the hydrofoil 24 (Figs. 1 and 2) the upper inclined members 28 and the horizontal spanner 34 are each made up of lifting surfaces of the *a* type (Fig. 3); the lower inclined members 30 are made up of lifting surfaces of type *b* (Fig. 4); the base member 32 is made up of a lifting surface of the *c* type (Fig. 5); and the strut 38 is made up of a surface of the *a'* type (Fig. 6).

The lifting surfaces of the diamond-shaped hydrofoil 24 (Figs. 1 and 2) may be modified within the scope of this invention. That is, one modification consists of forming the upper inclined lifting members 28, the horizontal spanner 34 and the lower inclined members 30 of lifting surfaces of the *a* (Fig. 3) type, with the base member 32 formed with a lifting surface of the *c* type (Fig. 5), and with strut 38 formed with a surface of the *a'* type (Fig. 6).

Another modification of the diamond-shaped hydrofoil (Figs. 1 and 2) consists of forming the upper inclined members 28 and the horizontal spanner 34 with lifting surfaces of the *a* type (Fig. 3), forming the lower inclined members 30 and the base member 32 of lifting surfaces of the *b* type (Fig. 4), and forming the strut 38 with a surface of type *a'* (Fig. 6).

Referring now to Figs. 3 to 8, inclusive, which illustrate typical hydrofoil and strut shapes in accordance with this invention, wherein:

Shape *a* (Fig. 3) is a hydrofoil section having the shape of a teardrop characterized by a rounded leading edge, a sharp trailing edge, a center of volume ahead of its midpoint, a convex upper surface, and a convex or convex-concave lower surface;

Shape *b* (Fig. 4) is a relatively flat hydrofoil section characterized by a sharp or slightly rounded leading edge, a sharp trailing edge, a convex top surface approximating an arc of a circle, and a straight or concave bottom surface, also approximating an arc of a circle;

Shape *c* (Fig. 5) is a hydrofoil section having a wedge shape characterized by a sharp leading edge, a blunt trailing edge, a convex, or convex-concave top surface, and a concave bottom surface approximating the arc of a circle;

Shape *a'* (Fig. 6) is a symmetrical strut section characterized by a rounded leading edge, a sharp trailing edge, a center of volume ahead of its midpoint, and both surfaces convex, or convex-concave;

Shape *b'* (Fig. 7) is a symmetrical strut section characterized by a sharp or slightly rounded leading edge, a sharp trailing edge, and both surfaces convex, approximating an arc of a circle; and Shape *c'* (Fig. 8) is a symmetrical strut section characterized by a rounded leading edge, a blunt trailing edge, and both surfaces convex, approximating a cubic parabola.

Figs. 9 and 10 illustrate a cavitation-adapted, ladder-type hydrofoil 40 incorporating the present invention. As shown, hydrofoil 40 comprises a pair of upper inclined lifting members or foils 41, a pair of intermediate inclined foils 42, a base foil 43, an upper strut section 44, an intermediate strut section 45 and a lower strut section 46; all welded into a rigid unitary structure. Strut 44 may be attached to the watercraft by any suitable means not shown.

In this embodiment (Figs. 9 and 10) of the invention, the upper foils 41 are formed with lifting surfaces of the *a* type (Fig. 3), with strut section 44 of the *a'* type (Fig. 6); the intermediate foils 42 are formed with lifting surfaces of the *b* type (Fig. 4), with strut section 45 of the *b'* type (Fig. 7); and with base foil 43 formed with a lifting surface of the *c* type (Fig. 5), with strut section 46 of the *c'* type (Fig. 8).

A first modification of the cavitation-adapted, ladder-type hydrofoil 40 (Figs. 9 and 10) comprises forming the upper foils 41 and the intermediate foils 42 of the *a* type (Fig. 3) lifting surfaces, with strut sections 44 and 45 of the *a'* type section (Fig. 6); and with the bottom foil 43 formed with the *c* type (Fig. 5) lifting surface, with strut section 46 formed of either the *b'* type (Fig. 7) or the *c'* type (Fig. 8).

A second modification of the cavitation-adapted, ladder-type hydrofoil (Figs. 9 and 10) comprises forming the upper foils 41 and intermediate foils 42 of the *a* type (Fig. 3) lifting surface, with strut sections 44 and 45 of the *a'* type (Fig. 6); and with the bottom foil 43 formed of the *b* type (Fig. 4) lifting surface, with strut section 46 formed of the *b'* type (Fig. 7).

Figs. 11 and 12 illustrate a second cavitation-adapted, ladder-type hydrofoil incorporating the present invention. Here the hydrofoil 50 comprises an upper pair of inclined foils 51 connected by a horizontal foil 52, an intermediate pair of inclined foils 53 connected by a horizontal foil 54, a horizontal base or bottom foil 55, an upper pair of strut sections 56, an intermediate pair of strut sections 57 and a lower pair of strut sections 58; all welded into a rigid unitary structure. Strut sections 56 may be used to attach the hydrofoil to the watercraft by suitable means (not shown).

In this (Figs. 11 and 12) embodiment of the invention, the upper inclined foils 51 and the horizontal foil 52 are formed with lifting surfaces of the *a* type (Fig. 3) with upper strut sections 56 of the *a'* type (Fig. 6); with the intermediate pair of inclined foils 53 and horizontal foil 54 formed of the *b* type (Fig. 4) and intermediate strut sections 57 of the *b'* type (Fig. 7); and with the base or bottom foil 55 formed of the *c* type (Fig. 5) and bottom strut sections of the *c'* type (Fig. 8).

The type of foil and strut sections may be modified in the embodiment of the invention illustrated in Figs. 11 and 12 in substantially the same manner as that described above with reference to the embodiment illustrated in Figs. 9 and 10, depending upon the types of craft with which the hydrofoil is to be used.

Figs. 13–15 illustrate a third cavitation-adapted, ladder-type hydrofoil incorporating the present invention. With this embodiment, the hydrofoil 60 comprises a pair of loop-shaped foils 61 joined at their lower ends by a horizontal foil 62, a bottom foil 63, a pair of upper strut sections 64 and a pair of lower strut sections 65. Except for the bottom foil 63, which is pivotally mounted on the bottoms of strut sections 65, the foil and strut sections are welded into a rigid unitary structure with the strut sections in substantially parallel vertical planes and, as shown in Fig. 14, with the entire hydrofoil assembly in one major vertical plane. Strut sections 64 may be used for attaching the hydrofoil to the watercraft by suitable means (not shown).

In this (Figs. 13–15) embodiment of the invention, the pair of loop-shaped foils 61 are formed with lifting surfaces of the *a* type (Fig. 3) with the upper strut sections 64 of the *a'* type (Fig. 6); with horizontal foil 62 formed with lifting surfaces of the *b* type (Fig. 4); and with bottom foil 63 formed with the *c* type (Fig. 5) lifting surfaces, with the lower strut sections 65 formed of the *c'* type (Fig. 8) section. As with the other embodiments of the invention, the foil and strut sections in this (Figs. 13–15) embodiment may be modified to fit speed and load conditions.

This operation of the various hydrofoil sections, that is, the regimes of flow with their attendant speeds is graphically illustrated in Fig. 16. As shown, up to speeds of about 45 knots there is no cavitation on hydrofoil sections *a*, *b* or *c*, and at this speed, with applicant's invention, all three sections may be beneath the surface of the water. At speeds of about 55 knots there would be destructive cavitation on section *a* and no noticeable cavitation on sections *b* or *c*. However, in accordance with the instant invention, only sections *b* and *c* are immersed at 55 knots, so that section *a* is not effected by this speed. At 65 knots there would be destructive cavitation on sections *a* and *b* and nondestructive cavitation on section *c*. However, again in accordance with the instant invention, only section *c* is immersed at 65 knots, so that sections *a* and *b* are not affected by this high speed. As shown, at 65 knots a fixed water vapor bubble or nondestructive cavity is formed on section *c* from the leading edge, across the top surface to a point well beyond the trailing edge.

Fig. 17 graphically illustrates the operation of strut sections *a'*, *b'* and *c'* at the various speeds that they may be submerged in the same manner as that described immediately above for the hydrofoil sections.

Thus, it is shown, in accordance with this invention, the various hydrofoil sections and the various strut sections are so shaped and so chosen relative to each other and to the various speeds of the craft as to be free of destructive cavitation thereon at any speed during which such surfaces are normally submerged.

It should be understood, of course, that the foregoing disclosure relates to only preferred embodiments of the invention and that numerous modifications or alterations may be made therein without departing from the spirit and the scope of the invention as set forth in the appended claims.

What is claimed is:

1. A cavitation-adapted hydrofoil arranged below the hull of a watercraft and comprising a plurality of vertically-spaced lifting surfaces constructed and arranged in a manner that as the speed of the craft increases the craft rises progressively out of the water successively emerging the foil lifting surfaces until at top speed the craft rides only on the lower lifting surfaces, said lifting surfaces having cross-sectional shapes such as to be free of destructive cavitation thereon at any speed during which such surfaces are normally submerged, said vertically-spaced lifting surfaces include an upper lifting surface having a cross-sectional shape simulating a teardrop, an intermediate lifting surface having a relatively thin cross-sectional shape comprising gentle curves and a lower lifting surface having a cross-sectional shape simulating a wedge.

2. A cavitation-adapted hydrofoil as set forth in claim 1 wherein the vertically-spaced lifting surfaces are connected by strut members having cross-sectional shapes such as to be free of destructive cavitation thereon at any speed during which the strut members are normally submerged, said strut members include an upper strut having a symmetrical cross-sectional shape simulating a teardrop, an intermediate strut having a symmetrical cross-sectional shape comprising two convex surfaces each approximating an arc of a circle and a lower strut having a symmetrical cross-sectional shape comprising two convex surfaces each approximating a cubic parabola.

3. A cavitation-adapted hydrofoil as set forth in claim 1 wherein the hydrofoil is connected to the watercraft by a strut having a cross-sectional shape simulating a teardrop.

4. A cavitation-adapted hydrofoil as set forth in claim 1 wherein the plurality of vertically-spaced lifting surfaces include an upper inverted V-shaped member, an intermediate substantially horizontal member and a lower substantially U-shaped member, all of said members being united into a unitary structure.

5. A cavitation-adapted hydrofoil as set forth in claim 4 wherein the upper inverted V-shaped member and the intermediate horizontal member comprise a cross-sectional shape characterized by a rounded leading edge, a sharp trailing edge, a center of volume ahead of its midpoint, a convex top surface, and a convex lower surface, wherein the lower U-shaped member includes a pair of inclined legs connected by a horizontal bottom member with the inclined legs comprising a cross-sectional shape characterized by a relatively sharp leading edge, a sharp trailing edge, a concave top surface approximating an arc of a circle and concave bottom surface approximating an arc of a circle, and wherein the bottom horizontal member comprising a cross-sectional shape characterized by a sharp leading edge, a blunt trailing edge, a convex top surface and a concave bottom surface approximating an arc of a circle.

6. A cavitation-adapted hydrofoil as set forth in claim 1 wherein the plurality of vertically-spaced lifting surfaces include an upper pair of diverging members, an intermediate pair of diverging members and a lower horizontal member, connected by struts into a unitary structure.

7. A cavitation-adapted hydrofoil as set forth in claim 6 wherein the upper pair of diverging members comprise a cross-sectional shape characterized by a rounded leading edge, a sharp trailing edge, a center of volume ahead of its midpoint, a convex top surface, and a convex lower surface, wherein the intermediate pair of diverging members comprise a cross-sectional shape characterized by a relatively sharp leading edge, a sharp trailing edge, a concave top surface approximating an arc of a circle and concave bottom surface approximating an arc of a circle and wherein the lower horizontal member comprises a cross-sectional shape characterized by a sharp leading edge, a blunt trailing edge, a convex top surface and a concave bottom surface approximating an arc of a circle.

8. A cavitation-adapted hydrofoil as set forth in claim 1 wherein the plurality of vertically-spaced lifting surfaces include an upper section comprising a pair of inclined members connected by a horizontal member, an intermediate section comprising a pair of inclined members connected by a horizontal member, and a lower section comprising a horizontal member, all connected into a unitary structure.

9. A cavitation-adapted hydrofoil as set forth in claim 8 wherein the upper section comprises a cross-sectional shape characterized by a rounded leading edge, a sharp trailing edge, a center of volume ahead of its mid-point, a convex top surface, and a convex lower surface, wherein the intermediate section comprises a cross-sectional shape characterized by a relatively sharp leading edge, a sharp trailing edge, a concave top surface approximating an arc of a circle and concave bottom surface approximating an arc of a circle, and wherein the lower section comprises a cross-sectional shape characterized by a sharp leading edge, a blunt trailing edge, a convex top surface and a concave bottom surface approximating an arc of a circle.

10. A cavitation-adapted hydrofoil as set forth in claim 1 wherein the plurality of vertically-spaced lifting surfaces include an upper section comprising a pair of bowed members, an intermediate section comprising a horizontal member and a lower section comprising a horizontal member, all connected into a unitary structure.

11. A cavitation-adapted hydrofoil as set forth in claim 10 wherein the upper section comprises a cross-sectional shape characterized by a rounded leading edge, a sharp trailing edge, a center of volume ahead of its mid-point, a convex top surface, and a convex lower surface, wherein the intermediate section comprises a cross-sectional shape characterized by a relatively sharp leading edge, a sharp trailing edge, a concave top surface approximating an arc of a circle and concave bottom surface approximating an arc of a circle and wherein the lower section comprises a cross-sectional shape characterized by a sharp leading edge, a blunt trailing edge, a convex top surface and a concave bottom surface approximating an arc of a circle.

References Cited in the file of this patent

FOREIGN PATENTS

| | | |
|---|---|---|
| 517,519 | Germany | Feb. 4, 1931 |
| 572,413 | Great Britain | Oct. 8, 1945 |
| 715,850 | Great Britain | Sept. 22, 1954 |
| 760,525 | Great Britain | Oct. 31, 1956 |
| 820,896 | France | Aug. 9, 1937 |